United States Patent Office 2,950,170
Patented Aug. 23, 1960

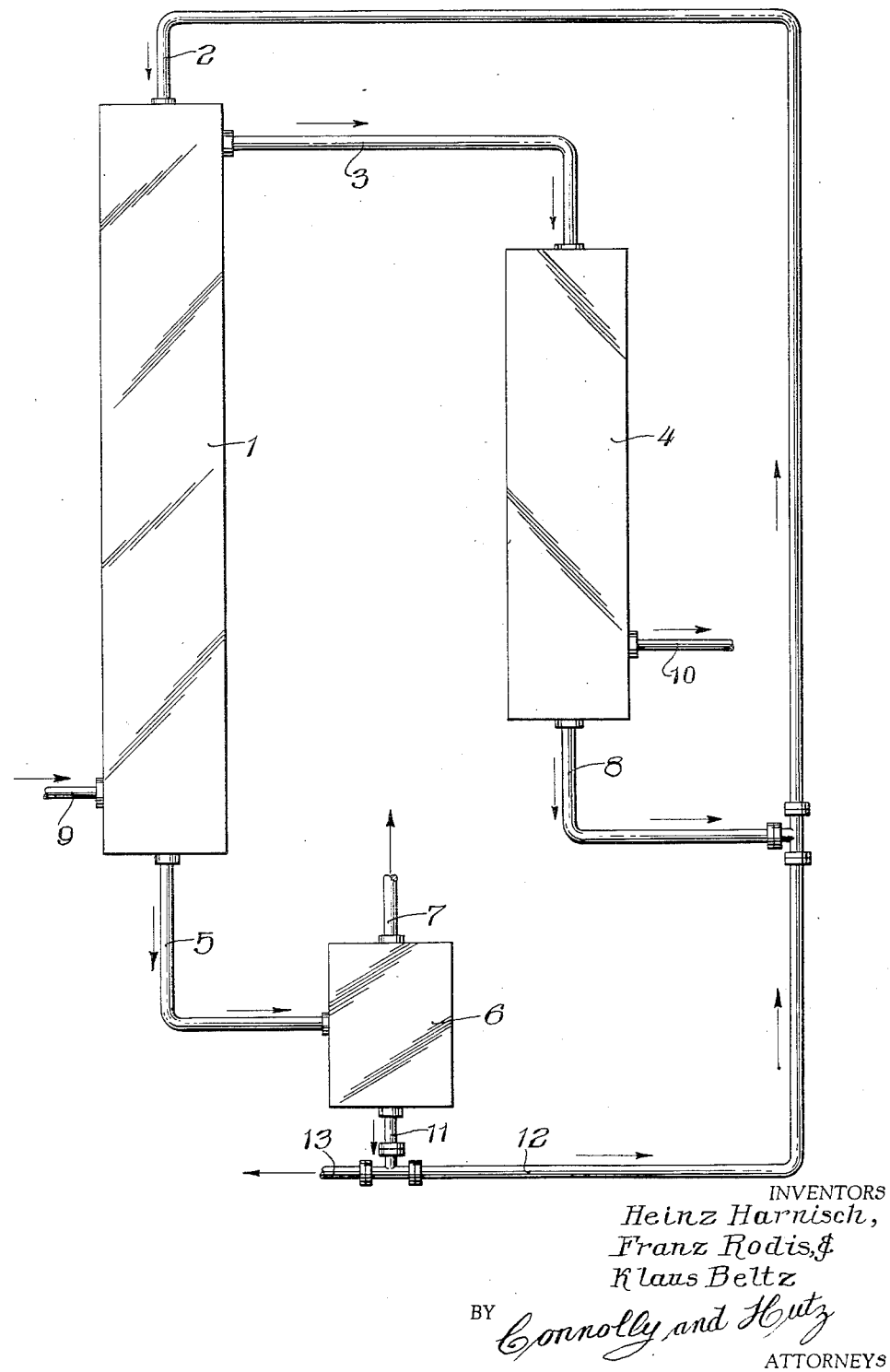

2,950,170

RECOVERY OF HYDROGEN HALIDES

Heinz Harnisch, Koln-Klettenberg, and Franz Rodis and Klaus Beltz, Knapsack, near Koln, Germany, assignors to Knapsack-Griesheim Aktiengesellschaft, Knapsack, near Koln, Germany, a corporation of Germany Filed July 12, 1957, Ser. No. 671,604

Claims priority, application Germany July 19, 1956

9 Claims. (Cl. 23—154)

The present invention relates to a process for the production of highly concentrated hydrohalic acid especially of hydrochloric and hydrobromic acid, which is particularly suitable for the prepartion of pure gaseous hydrogen halide.

It is known to absorb a substance which is contained in an exhaust gas in vaporous or gaseous state with a liquid consisting of an azeotropic mixture of the substance to be obtained and a second substance. The concentrated solution of the first substance in the second one thus obtained is subsequently heated in a suitable device whereby the more readily volatile first substance escapes until the azeotropic composition is again attained. The azeotropic mixture is then used again for the absorption.

In case, however, the two substances forming the azeotropic mixture are contained from the outset in the exhaust gas, the first substance can only partially be obtained in pure form by the absorption-desorption process mentioned. In the extreme case, when the ratio of the first substance to the second substance in the exhaust gas just corresponds to the azeotropic composition, it is impossible to obtain by said process the first substance even partially in pure form. In each case when boiling out the first substance from its concentrated solution in the second substance an excess of azeotropic mixture is obtained for which very often a suitable application cannot be found.

Now we have found a process in which, according to the composition of the gas or vapor mixture, the formation of a generally undesired excess of azeotropic mixture can be avoided completely or at least to a large degree by using the portion of the exhaust gas which cannot be condensed under the operating conditions, as a carrier gas for removing the second substance from the absorption system used according to the invention. This is especially possible with a good effect when, starting from the azeotropic composition, the partial pressure relation of the first to the second substance strongly increases as the concentrations decrease.

The invention is carried out as follows: The hydrogen halide is separated in an absorption system in the course of at least two partial steps from a steam-containing gas and vapor mixture which contains in addition to said hydrogen halide a portion of permanent gas uncondensable under the operating conditions. In the first step the gas and vapor mixture is conducted in a countercurrent to hot aqueous hydrohalic acid running in from above and, relative to hydrogen halide, being below the azeotropic composition and heated in the upper or in the middle and upper part of the absorption system in a manner such that the portion of permanent gas of the gas and vapor mixture leaving on top previously absorbs, at a temperature below the boiling point of the acid added at the head, large amounts of steam but small amounts of hydrogen halide whereas at the bottom a concentrated hydrohalic acid is removed which can be worked up by boiling to obtain hydrogen halide of 100% strength and an about azeotropic acid. In the second step the gas and vapor mixture leaving at the head is subsequently cooled in a manner such that nearly the entire portion of hydrogen halide and only part of the steam are condensed.

Accordling to a further feature of the invention, the portion of the permanent gas of the gas and vapor mixture acting as carrier gas is used to remove at an appropriate temperature to be chosen at the head of the absorption system an amount of steam such that after the subsequent cooling of the gas and vapor mixture leaving at the head—and thus after the nearly complete separation of the hydrogen halide which had not been removed from the gas and vapor mixture in the absorption system by means of washing out together with only part of the steam—the amount of steam remaining in the exhaust gas following said condensation stage (second step) just corresponds to the amount of steam contained in the gas and vapor mixture introduced into the absorption system from below (first step).

The temperature at the head of the absorption system can be regulated by the temperature of the hot aqueous hydrohalic acid which is allowed to flow in from above or by an additional heating device.

The hot aqueous dilute hydrohalic acid which is allowed to flow into the absorption system from above is prepared by mixing the dilute acid, separated behind the absorption system by cooling, with the azeotropic acid obtained by boiling out hydrogen halide from the concentrated aqueous hydrohalic acid running off at the bottom of the absorption system.

The steam-containing gas and vapor mixture introduced into the absorption system may consist above all of exhaust gases having a high content of permanent gas and a relatively low content of halogen halide.

The temperature at the bottom of the absorption system can be regulated by an additional cooling device. It is also possible to cool the hot hydrogen halide- and steam-containing gas and vapor mixture before entering the absorption system to a temperature below about +40° C. in a precondensation stage and to combine the hydrohalic acid thus obtained having a content of hydrogen halide above the azeotropic composition with the concentrated hydrohalic acid flowing off at the bottom of the absorption system before the latter is worked up.

The process for the production of highly concentrated hydrochloric acid according to the invention is carried out as follows: The hydrogen chloride is separated in an absorption system in the course of two partial steps from a steam-containing gas and vapor mixture containing in addition to between about 0.5 and about 70% by volume of hydrogen chloride and between about 0.5 and about 40% by volume of steam also between about 5 and about 99% by volume of permanent gas which cannot be condensed under the operating conditions, the percent figures being calculated on the total amount of all gas and vapor components. In the first stage, the gas and vapor mixture is conducted in a countercurrent of hot aqueous hydrochloric acid running in from above weight of hydrogen chloride; at the same time the gas and vapor mixture is heated in the middle and upper part of the absorption tower in a manner such that the portion of permanent gas of the gas and vapor mixture leaving at the head of the tower absorbs at a temperature below the boiling point of the acid added at the head large amounts of steam but small amounts of hydrogen chloride, whereas at the bottom a concentrated hydrochloric acid is removed containing between about 25 and about 35% by weight of hydrogen chloride which is worked up by boiling to obtain hydrogen chloride of 100% strength and an about azeotropic acid containing about 21% by weight of hydrogen chloride. In the second stage, the gas and vapor mixture leaving at the head with a temperature between about +50 and about +105° C. which may contain between about 0.1 and about 5% by volume of hydrogen chloride and between about 3 and about 60% by volume of steam (rest permanent gas) is subsequently cooled to temperatures between about +20 and about +70° C. so that nearly the entire portion of hydrogen chloride is condensed together with only a part of the steam to obtain in the after-condensation stage an aqueous hydrochloric acid containing between about 0.1 and about 15% by weight of hydrogen chloride; the gas and vapor mixture leaving said after-condensation stage consists of between 0 and about 25% by volume of steam, preferably less than 0.1% by volume of hydrogen chloride and of permanent gas.

The gas and vapor mixture used as starting material may have any temperature. Also the aqueous acid flowing in from above may have any temperature, preferably however at least the desired temperature of the gas and vapor mixture leaving the absorption system at the head.

The starting gas and vapor mixture preferably contains between about 1 and about 15% by volume of hydrogen chloride, between about 1 and about 30% by volume of steam and between about 60 and about 99% by volume of permanent gas, the percent figures being calculated on the total amount of all gas and vapor components.

The gas and vapor mixture leaving at the head of the absorption system preferably at temperatures between about +60 and about +90° C. advantageously contains between about 0.1 and about 2% by volume of hydrogen chloride and between about 10 and about 50% by volume of steam (rest permanent gas).

The temperature of the gas and vapor mixture leaving the after-condensation stage mostly amounts to about +30 to about +60° C.

The concentration of the acid obtained after boiling shall of course be near the azeotropic composition. The more the concentration of HCl can be reduced by boiling, the better for the process. It is therefore advantageous to boil under a pressure as high as possible since in this case the azeotropic composition moves towards the smaller concentration of HCl. With good boiling devices, it is possible in any case to lower the content of hydrogen chloride to about 21% by weight.

It is possible to cool the hot hydrogen chloride and steam containing gas and vapor mixture in a pre-condensation stage to a temperature below about +40° C. and this prior to the admission into the absorption system, and to combine the hydrochloric acid thus obtained containing between about 25 and about 35% by weight of hydrogen chloride with the concentrated hydrochloric acid flowing off at the bottom of the absorption system before the acid is worked up.

The process for the production of highly concentrated hydrobromic acid according to the invention is carried out as follows: The hydrogen bromide is separated in an absorption system in the course of two partial steps from a steam-containing gas and vapor mixture containing in addition to between about 0.5 and about 50% by volume of hydrogen bromide and between about 0.5 and about 40% by volume of steam also between about 10 and about 99% by volume of permanent gas which cannot be condensed under the operating conditions, the percent figures being calculated on the total amount of all gas and vapor components. In the first step the gas and vapor mixture is conducted in a countercurrent to hot aqueous hydrobromic acid flowing in from above with a concentration between about 40 and about 49% by weight of hydrogen bromide; at the same time the gas and vapor mixture is heated in the middle and upper part of the absorption system in a manner such that the portion of permanent gas of the gas and vapor mixture leaving at the head of the system absorbs at a temperature below the boiling point of the acid added at the head large amounts of steam but small amounts of hydrogen bromide, whereas at the bottom concentrated hydrobromic acid is removed containing between about 53 and about 60% by weight of hydrogen bromide. Said hydrobromic acid is worked up by boiling to obtain hydrogen bromide of 100% strength and an about azeotropic acid containing about 48% by weight of hydrogen bromide.

In the second stage, the gas and vapor mixture leaving at the head at temperatures between about +40 and about +100° C. and containing between about 0.1 and about 5% by volume of hydrogen bromide and between about 3 and about 60% by volume of steam (rest permanent gas) is subsequently cooled to temperatures below about +60° C. in a manner such that nearly the entire portion of hydrogen bromide is condensed together with only part of the steam so that in the after-condensation stage an aqueous hydrobromic acid is obtained containing between about 5 and about 40% by weight of hydrogen bromide and that the gas and vapor mixture leaving said after-condensation stage contains between about 3 and about 20% by volume of steam, less than about 0.5% by volume of hydrogen bromide and between about 80 and about 97% by volume of permanent gas.

The starting gas and vapor mixture may have any temperature. Also the aqueous acid flowing in from above may have any temperature, preferably at least the desired temperature of the escaping gas.

The starting gas and vapor mixture preferably contains between about 0.5 and about 15% by volume of hydrogen bromide, between about 1 and about 30% by volume of steam and between about 60 and about 99% by volume of permanent gas.

The gas and vapor mixture leaving on the top of the absorption system preferably has a temperature between about +50 and about +80° C. and contains advantageously between about 0.1 and about 2% by volume of hydrogen bromide and between about 3 and about 40% by volume of steam (rest permanent gas).

In the after-condensation stage an aqueous hydrobromic acid is generally obtained having a concentration of hydrogen bromide between about 20 and about 35% by weight. The gas and vapor mixture leaving said after-condensation stage advantageously contains less than 0.1% by volume of hydrogen bromide.

It is possible to cool the hydrogen bromide- and steam-containing gas and vapor mixture in a precondensation stage to a temperature below about +40° C. and this prior to the admission into the absorption system and to combine the hydrobromic acid thus obtained containing between about 50 and about 60% by weight of hydrogen bromide with the concentrated hydrobromic acid leaving the absorption system at the bottom before the acid is worked up.

The annexed drawing shown diagrammatically represents a flowing scheme suitable for carrying out the process according to the invention.

1 represents the absorption tower, 2 the inlet pipe for dilute acid at the head of absorption tower 1, and 3 represents the outlet pipe for the gas and vapor mixture at the head of 1. The cooling device for the gas and vapor mixture is represented by 4, 5 the bottom outlet pipe for the concentrated acid from the absorption tower 1 and 6 the boiling device at the head of which hydrogen halide leaves by way of outlet pipe 7. The azeotropic acid leaves at 11 at the bottom of boiling device 6 and is partially removed from the process by way of outlet pipe 13 and partially mixed by way of outlet pipe 12 with the dilute acid which leaves at the bottom of cooling device 4 by way of outlet pipe 8. The mixture of azeotropic acid from boiling device 6 and dilute acid from cooling device 4 is reconducted to the head of absorption tower 1 by way of inlet pipe 2. The starting gas and vapor mixture of permanent gas, hydrogen halide and steam is introduced near the bottom into absorption tower 1 by way of inlet pipe 9 whereas the final gas leaves the cooling device 4 by way of outlet pipe 10 which gas is then removed.

The process according to the invention described with the help of the accompanying flowing scheme is carried out as follows: An exhaust gas consisting of steam, hydrogen chloride and considerable amounts of permanent or carrier gas is introduced by way of conduit 9 into absorption tower 1 and conducted in a countercurrent to hot dilute absorption acid which is allowed to run into said tower from above by way of conduit 2. The gas is heated in the upper part of absorption tower 1 by means of a suitable heating device, for example a heat exchanger of a nest of boiler tubes (not shown), in a manner such that the temperature at the head of tower 1 is maintained within a temperature range which has to be adjusted according to the steam content of the exhaust gas and the concentration of the acid which is allowed to run in and within which range the temperature of the added absorption acid may be situated. The added acid may also have higher temperatures. The permanent gas charged with steam and hydrogen chloride escaping at the head of absorption tower 1 through conduit 3 is subsequently cooled in cooling device 4 to a temperature such that practically the entire content of hydrogen chloride is condensed together with part of the steam. The concentrated hydrochloric acid leaving absorption tower 1 through conduit 5 is boiled out in boiling device 6 until the azeotropic composition has been attained again whereby pure gaseous hydrogen chloride escapes by way of conduit 7. The azeotropic acid flowing off by way of conduits 11 and 12 is then mixed with the dilute acid leaving cooling device 4 through conduit 8 and the mixture is reconducted by way of conduit 2 into absorption tower 1. The final gas and vapor mixture leaves at 10 and the excess of azeotropic acid at 13.

The described operating method can also be applied to gas and/or vapor mixtures containing in addition to the permanent or carrier gas two components forming an azeotropic mixture other than steam and hydrogen chloride.

The following examples serve to illustrate the invention but they are not intended to limit it thereto.

*Example 1*

Two normal cubic meters of a hot permanent gas charged with 162 g. of hydrogen chloride and 150 g. of steam travel through conduit 9 into absorption tower 1 at a temperature of +20° C. at the bottom of the absorption tower.

By condensing the steam and absorbing the hydrogen chloride in the absorption acid which trickles down, there are obtained from said 2 normal cubic meters of permanent gas 1128 g. of hydrochloric acid of about 31% strength (percent by weight) consisting of 351 g. of HCl and 777 g. of H₂O, flowing off by way of conduit 5. The exhaust gas ascending in absorption tower 1 is heated to +74° C. towards the top. Through conduit 3 are removed 569 g. of steam and 57 g. of gaseous hydrogen chloride in 2 normal cubic meters of permanent gas from the 1442 g. of acid of 17% strength (percent by weight) flowing in by way of conduit 2 at a temperature of +74° C. The remaining part of the acid flowing in through conduit 2 travels as absorption acid through absorption tower 1 with a content of about 23% by weight of hydrogen chloride.

In cooling device 4 the gas mixture entering by way of conduit 3 is cooled to about +40° C. whereby 483 g. of water and 57 g. of hydrogen chloride are separated in the form of 540 g. of acid of 10.5% strength (percent by weight) which leave by way of conduit 8, whereas 86 g. of steam remain in the 2 normal cubic meters of permanent gas in the gaseous phase and escape through conduit 10.

In boiling device 6, there are expelled by way of conduit 7 from the acid of 31% strength (percent by weight) flowing off through conduit 5, 145 g. of gaseous hydrogen chloride of 100% strength, so that 983 g. of acid of 21% strength (percent by weight) run off through conduit 11. By mixing 902 g. of said acid of 21% strength (percent by weight), branched off through conduit 12, with 540 g. of acid of 10.5% strength (percent by weight) running in through conduit 8, there are obtained 1442 g. of acid of 17% strength (percent by weight) which is again run into absorption tower 1 by way of conduit 2. 81 g. of hydrochloric acid of 21% strength (percent by weight) are withdrawn from the process through conduit 13. The withdrawn acid contains 17 g. of hydrogen chloride which cannot be obtained as gas of 100% strength. 17 g. represent only 10.5% by weight of the hydrogen chloride content of the exhaust gas.

As compared therewith, by the usual absorption processes 40 g. of hydrogen chloride, i.e. nearly 25% by weight cannot be obtained as gaseous hydrogen chloride of 100% strength.

The percentage of 10.5% by weight found in the present example does not represent a minimum value of excessive azeotropic hydrogen chloride. By correspondingly increasing the surface of contact of absorption tower 1, the yield of excessive azeotropic mixture can completely be avoided at the chosen composition of the exhaust gas.

*Example 2*

From 250 g. of hydrogen bromide and 46 g. of water contained in 2 normal cubic meters of permanent gas of an hot exhaust gas are obtained in outlet pipe 5 together with the absorption acid trickling down in the absorption tower 1586 g. of hydrobromic acid of 56.8% strength (percent by weight). Each 2 normal cubic meters of permanent gas escaping at the head of absorption tower 1 through conduit 3 at a temperature of +65° C. remove from 1500 g. of acid of 46% strength (percent by weight) traveling in by way of conduit 2, 40 g. of hydrogen bromide and 170 g. of water so that 1290 g. of acid of 50.4% strength (percent by weight) pass as absorption acid through absorption tower 1. In cooling device 4 the gas and vapor mixture entering by way of conduit 3 is cooled in a manner such that per 2 normal cubic meters of permanent gas 164 g. of hydrobromic acid of 24.4% strength (percent by weight) are separated which flow off through conduit 8, whereas 46 g. of water remain in the exhaust gas leaving by way of conduit 10.

In boiling device 6 there are expelled through conduit 7 from 1586 g. of acid of 56.8% strength (percent by weight) running off through conduit 5, 250 g. of hydrobromic acid of nearly 100% strength so that 1336 g. of acid of 48.6% strength (percent by weight) remain which are mixed with 164 g. of acid of 24.4% strength (percent by weight) flowing off through conduit 8; there are obtained 1500 g. of acid of 46% strength (percent by weight) which are reconducted by way of conduit 2 into absorption tower 1.

In this example the entire content of hydrogen bromide of the exhaust gas can be obtained as gaseous hydrogen bromide of 100% strength whereas in the usual processes the yield amounts to at most 85%.

*Example 3*

72 normal cubic meters of permanent gas charged with 6 kg. of hydrogen chloride and 5.8 kg. of steam are cooled in a precondenser from +98° C. to +35° C. whereby 6.8 kg. of acid of 31% strength (percent by weight) are separated which consist of 2.11 kg. of HCl and 4.69 kg. of $H_2O$, so that 3.89 kg. of hydrogen chloride and 1.11 kg. of steam remain in the permanent gas which is introduced at the bottom of absorption tower 1. In the absorption tower which is charged with 56.29 kg. of hydrochloric acid of 18.5% strength (percent by weight) having a temperature of +75° C. there are obtained at the bottom 42.2 kg. of acid of 29.7% strength (percent by weight). The gas leaving the tower at a temperature of +71.5° C. contains 17.31 kg. of steam and 1.78 kg. of hydrogen chloride and is cooled in the after-condenser to +42° C. 15.1 kg. of hydrochloric acid of 11.8% strength (percent by weight) are separated so that the escaping gas still contains 3.99 kg. of steam and only traces of hydrogen chloride.

6.8 kg. of acid of 31% strength (percent by weight) obtained in the precondenser and 42.2 kg. of acid of 29.7% strength (percent by weight) from the absorption tower are combined and worked up in a boiling device whereby 5.50 kg. of gaseous HCl of 100% strength and 43.48 kg. of hydrochloric acid of 21% strength (percent by weight) are obtained. 41.19 kg. of the acid so obtained are mixed with 15.1 kg. of acid of 11.8% strength (percent by weight) from the after-condenser and introduced again as acid of 18.5% strength (percent by weight) at the head of the absorption tower. 2.29 kg. of acid of 21% strength (percent by weight) must be removed from the process.

In the present example 92% (percent by weight or by volume) of the HCl content of the gas mixture are therefore obtained in the form of pure gaseous hydrogen chloride. With the hitherto usual methods only up to about 79% (percent by weight or by volume) of the hydrogen chloride can be obtained in the form of gaseous HCl of 100% strength.

We claim:

1. A process for recovering a substantially anhydrous hydrogen halide selected from the group consisting of hydrogen chloride and hydrogen bromide from a gas stream consisting essentially of permanent gas carrying a substantial amount of water vapor as well as said hydrogen halide, in a proportion more concentrated than azeotropic with respect to the hydrogen halide, said process being characterized by the steps of washing said stream in countercurrent with a water solution of said hydrogen halide having a concentration less than azeotropic with respect to the hydrogen halide, which water solution as it enters the washing is above 50° C. to cause the gas stream leaving the washing to carry water vapor and a relatively small concentration of hydrogen halide, the washing liquid being cooled as it goes through the washing so that as it emerges from the washing it absorbs hydrogen halide from the entering stream and reaches a hydrogen halide concentration greater than azeotropic; working up said emerging acid by boiling to obtain hydrogen halide of 100% strength and an essentially azeotropic acid; cooling the washed gas stream in a manner such that substantially all its hydrogen halide is condensed together with part of its water vapor to form an aqueous hydrohalide solution less concentrated than azeotropic with respect to hydrogen halide and to leave the residual gas with the excess of water vapor and less than about 0.1% by volume of hydrogen halide.

2. The combination of claim 1 in which recovered azeotropic solution is mixed with the condensed solution to make the washing solution for the incoming gas stream.

3. The combination of claim 1 in which the incoming gas stream is the gaseous effluent from the condensation of a hot waste gas mixture containing larger quantities of both water vapor and hydrogen halide, and the resulting condensate is added to the solution recovered from the cold washing.

4. A process for the recovery of substantially pure hydrogen chloride from a permanent gas stream containing between about 0.5 and about 70% by volume of hydrogen chloride, between about 0.5 and about 40% by volume of water vapor, and between about 5 and about 99% by volume of permanent gas, the hydrogen chloride and water vapor being present in a proportion more concentrated than azeotropic, the percent figures being calculated on the total amount of all gas and vapor components, said process being characterized by the steps of washing the stream in countercurrent with hot aqueous hydrochloric acid having a concentration of hydrogen chloride between about 12 and about 21% by weight while maintaining the gas and vapor mixture at the liquid washing outflow relatively cold to cause the gas stream leaving the washing to be at a temperature between about 50 and about 105° C. and to contain between about 0.1 and about 5% by volume of hydrogen chloride and between about 3 and about 60% by volume of water vapor, and to also cause the liquid washing outflow to reach a hydrogen chloride concentration between about 25 and about 35% by weight; working up said acid outflow by boiling to obtain hydrogen chloride of 100% strength and an essentially azeotropic acid containing about 21% by weight of hydrogen chloride; cooling the washed gas stream to a temperature between about 20 and about 70° C. in a manner such that substantially all its hydrogen chloride is condensed together with part of its water vapor to form an aqueous hydrochloric acid containing between about 0.1 and about 15% by weight of hydrogen chloride and to leave the residual gas with less than about 0.1% by volume of hydrogen chloride.

5. A process for the recovery of substantially pure hydrogen bromide from a permanent gas stream containing between about 0.5 and about 50° by volume of hydrogen bromide, between about 0.5 and about 40% by volume of water vapor, and between about 10 and about 99% by volume of permanent gas, the hydrogen bromide and water vapor being present in a proportion more concentrated than azeotropic, the percent figures being calculated on the total amount of all gas and vapor components, said process being characterized by the steps of washing the stream in countercurrent with hot aqueous hydrobromic acid having a concentration of hydrogen bromide between about 40 and about 49% by weight while maintaining the gas and vapor mixture at the liquid washing outflow relatively cold to cause the gas stream leaving the washing to be at a temperature between about 40 and about 100° C. and to contain between about 0.1 and about 5% by volume of hydrogen bromide and between about 3 and about 60% by volume of water vapor, and to also cause the liquid washing outflow to reach a hydrogen bromide concentration between about 53 and about 60% by weight; working up said acid outflow by boiling to obtain hydrogen bromide of 100% strength and an essentially azeotropic acid containing about 48% by weight of hydrogen bromide; cooling the washed gas stream to a temperature below 60° C. in a manner such that substantially all its hydrogen bromide is condensed together with part of its water vapor to form an aqueous hydrobromic acid containing between about 5 and about 40% by weight of hydrogen bromide and to leave the residual gas with less than about 0.5% by volume of hydrogen bromide.

6. The combination of claim 4, wherein the incoming gas stream contains between about 1 and about 15% by volume of hydrogen chloride, between about 1 and about 30% by volume of steam and between about 60 and about 99% by volume of permanent gas.

7. The combination of claim 4, wherein the gas stream leaving the washing has a temperature between about +60 and about +90° C. and contains between about 0.1 and about 2% by volume of hydrogen chloride and between about 10 and about 50% by volume of water vapor.

8. The combination of claim 5, in which the cooling of the washed gas stream is to a temperature between about +30 and about +60° C.

9. The combination of claim 5, wherein the gas stream leaving the washing system has a temperature between about +50 and about +80° C. and contains between about 0.1 and about 2% by volume of hydrogen bromide and between about 3 and about 40% by volume of water vapor.

References Cited in the file of this patent

UNITED STATES PATENTS

| | | |
|---|---|---|
| 1,897,996 | Barstow et al. | Feb. 21, 1933 |
| 2,690,815 | Calfee et al. | Oct. 5, 1954 |

UNITED STATES PATENT OFFICE

CERTIFICATE OF CORRECTION

Patent No. 2,950,170                                August 23, 1960

Heinz Harnisch et al.

It is hereby certified that error appears in the printed specification of the above numbered patent requiring correction and that the said Letters Patent should read as corrected below.

Column 2, line 59, for "of" read -- to --; line 60, after "above" insert -- and containing between about 12 and about 21% by --; column 8, line 34, for "50°" read -- 50% --.

Signed and sealed this 4th day of April 1961.

(SEAL)
Attest:    ERNEST W. SWIDER
Attesting Officer

ARTHUR W. CROCKER
                                                 Acting Commissioner of Patents